United States Patent [19]

Frei

[11] Patent Number: 5,100,066

[45] Date of Patent: Mar. 31, 1992

[54] METHOD FOR PROCESSING DOMESTIC, INDUSTRIAL AND OTHER SIMILAR WASTE WITH THE PRODUCTION OF A CELLULOSE MATERIAL

[75] Inventor: Josef Frei, Oberehrendingen, Switzerland

[73] Assignee: Organ-Faser Technology Company N.V., Curacao, Netherlands Antilles

[21] Appl. No.: 598,243

[22] Filed: Oct. 16, 1990

[30] Foreign Application Priority Data

Oct. 16, 1989 [DE] Fed. Rep. of Germany ....... 3934478

[51] Int. Cl.$^5$ .............................................. B02C 21/00
[52] U.S. Cl. ...................................... 241/21; 241/24; 241/29; 241/DIG. 38
[58] Field of Search ................... 241/23, 24, DIG. 38, 241/29, 21; 162/261, 4

[56] References Cited

U.S. PATENT DOCUMENTS

| | | | |
|---|---|---|---|
| 3,720,380 | 3/1073 | Marsh | 241/DIG. 38 X |
| 3,873,410 | 3/1975 | Chupka | 241/DIG. 38 X |
| 4,623,515 | 11/1986 | Frei et al. | |
| 4,809,854 | 3/1989 | Tomaszek | 241/DIG. 38 X |
| 4,815,668 | 3/1989 | Frei | 241/23 |

FOREIGN PATENT DOCUMENTS

| | | |
|---|---|---|
| 3105597 | 9/1982 | Fed. Rep. of Germany. |
| 3535633 | 4/1987 | Fed. Rep. of Germany ... 241/DIG. 38 |
| 1502093 | 8/1989 | U.S.S.R. ..................... 241/DIG. 38 |

Primary Examiner—Mark Rosenbaum
Attorney, Agent, or Firm—Scully, Scott, Murphy & Presser

[57] ABSTRACT

The invention relates to a method for processing domestic, industrial and other like waste with the production of a cellulose material in which the waste material is subjected to pre-comminution, magnetic separation, air-classification and fractionating. It is primarily characterized in that the light fraction consisting of paper, textiles and plastics material separated in the air-classification is passed to a washing station and the washed air-floatable materials passed into a pulper, the ballast substances are removed following the treatment in the pulper by means of screening and the cellulose particles distributed in the water that pass the screen are introduced, directly or after pressing out the water, to a paper mill that may be associated with the plant, or the pressed cellulose particles are dried and recovered as powder.

5 Claims, 1 Drawing Sheet

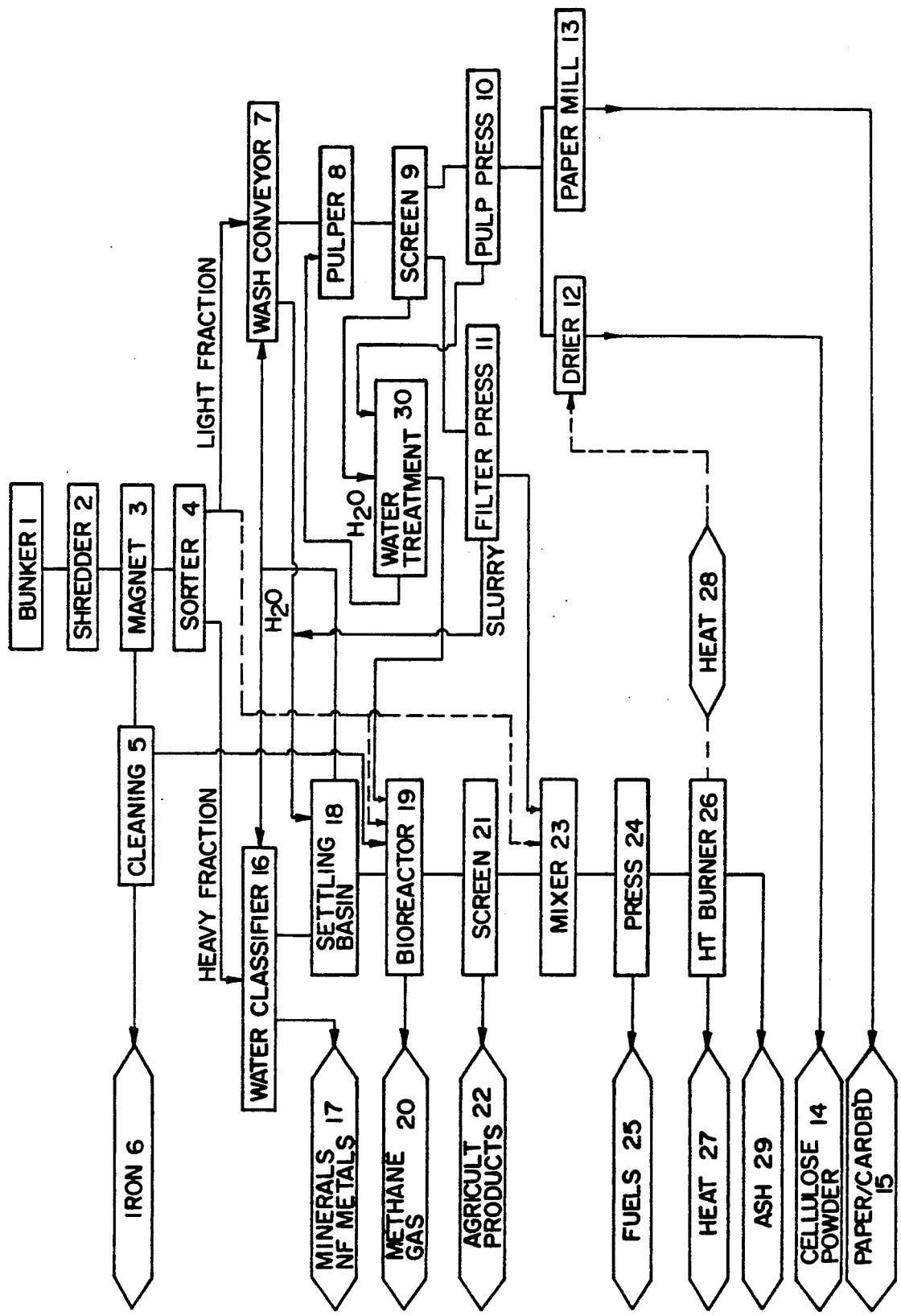

METHOD FOR PROCESSING DOMESTIC, INDUSTRIAL AND OTHER SIMILAR WASTE WITH THE PRODUCTION OF A CELLULOSE MATERIAL

TECHNICAL FIELD OF THE INVENTION AND PRIOR ART

The present invention relates to a method for processing domestic, industrial and other similar waste with the production of a cellulose material in which the waste material undergoes preliminary comminution, magnetic separation, air-classification and fractionation. Such methods are described for example in DE-PS 31 05 597, U.S. Pat. No. 4,623,515 and U.S. Pat. No 4,815,668.

SUMMARY OF THE INVENTION

Based on the this prior art the basic principle of the present invention consists in supplying the light fraction of paper, textiles and plastics materials separated out in the air-classification to a washing station and passing the washed air-floatable material to a pulper; after the treatment in the pulper the ballast is removed by screening and the cellulose particles dispersed in water that pass through the sieve are supplied as pulp, either directly or after pressing out the water, to a paper mill that may be associated with the plant, or the pressed-out cellulose particles are dried to produce powder.

In addition to this procedure the proposed type of processing enables further fractions to be separated in an advantageous manner. Apart from the recovery of metals and mineral components this includes the production of methane gas from the readily decomposable dirt materials and conversion of the remaining solids to agricultural products and also the processing of the non-decomposable energy bearing materials to form substances that can be stored and burned.

It is well known that all over the world there are even today still problems of refuse disposal, especially in the case of mixed domestic, commercial and to some extent also factory waste. The problem can be divided into two main parts:

a) effluent-free disposal
b) recovery of the recyclable constituents, some of which are valuable.

Various methods are known and already used for disposal, for example,
combustion with utilization of the energy
dumping with gas recovery
processing with the recovery of compost and/or fuel
separate collection of individual components such as metals, glass, paper and garden refuse,
hand sorting on picking belts to recover individual components
recycling systems for the production of fibrous and granular fractions as intermediate and/or additional materials in the production of appropriate products (DE-PS 31 05 597, U.S. Pat. No. 4,623,515 and U.S. Pat. No. 4,815,668).

However, all these disposal methods and techniques suffer from certain disadvantages such as:
poor product quality
only partial solutions owing to incomplete concepts
excessive residues
more or less uneconomic nature due to high energy and operating costs
excessive burden on the environment.

Systems are also known in which the sorted waste, as already mentioned above, is used in part as secondary raw material in special processes. This applies in particular to separately collected or hand sorted waste paper. The conventional paper recycling systems however only provide partial solutions and likewise suffer from disadvantages.

The disadvantageous effects are:

1. Solid residues occur in the pulp production to the extent of about 30% of the input of old paper, owing to the high degree of contamination of the old paper with plastics, wood, textile and other organic waste.

These ballast materials nowadays have to be disposed of (dumped or burned) at great expense. Although these ballast materials have a high content of thermal energy, much energy must be expended to bring them to the combustion area in order to make use of their energy content, or else they must be disposed of in special dumps, in which case the available energy is lost.

2. Contaminated slurries result from substances that readily rot and go mouldy from waste paper smeared with vegetable and food waste. The solids in these contaminated slurries have a high energy content and hitherto have had to be stored in special dumps or thermally treated and burned.

Both variants are cost-intensive and uneconomic.

The above remarks show clearly that only partial solutions with many disadvantages are known or available for the disposal, recycling and utilization of waste materials. Accordingly the object is to develop a method and apparatus for converting unsorted domestic and industrial refuse to high-grade and other products with the least possible outlay and the greatest efficiency.

According to the invention the waste is treated so as to produce generally useful products such as:

| | |
|---|---|
| metals | for recycling |
| minerals | for the building industry |
| methane gas | |
| agricultural products | fertilizers and carriers |
| solid fuels | |
| energy electrical and thermal | for internal use |
| cellulose powder | for carriers and additives |
| paper pulp | for paper and cardboard production |

In mixed household refuse the proportion of paper (despite separate collection) amounts to 15 to 30% by weight.

According to the invention this cellulose, which would otherwise be lost, is separated mechanically from the mixed waste and converted to reusable products such as pulp or powder. In addition a storable methane gas is produced from the readily decomposable contaminants and the remaining solids are converted to agricultural products. In addition the non-decomposable energy materials are worked up to form storable and combustible substances and mineral and metallic substances are sorted so that they can be passed on for recycling.

BRIEF DESCRIPTION OF THE DRAWING

The invention will now be described in more detail with reference to the accompanying drawing, which is a flow diagram of the process.

DETAILED DESCRIPTION OF PREFERRED EMBODIMENTS OF THE INVENTION

The collected mixed domestic household refuse is tipped from the collecting vehicles into the bunker 1. The refuse is mechanically transported to position 2, namely pre-comminution by means of a shredder. This serves to loosen up the refuse and to pre-comminute it to a maximum size of about 20×30 cm. An electromagnet 3 placed above the conveyor system between 2 and 4 removes the ferrous metals from the stream of material. The ferrous metals that have been withdrawn are passed to the purification step 5 which frees the scrap from contaminants. The cleaned metals pass to 6, with baling or charging into containers followed by passing on to an appropriate recycling operation. The contaminants separated in step 5 are mainly organic substances and are conveyed to the bioreactor 19 for gasification.

This bioreactor 19 is a commercial plant and serves to convert the volatile substances in the organic part to gas and to separate them from the organic solids. The gases are prepared and purified so that they can be marketed via step 20 as storable combustion gases that are transportable in containers.

The solids from step 19 pass to the screening operation 21 that separates the material into two fractions. Fine material is worked up in 22 to fertilizer products. The coarse material, which consists in part of non-gasifiable energy carrying particles, passes to a mixing station 23 where it is mixed with other energy carriers from 11 and possibly also 4. The mixture is led to the press 24. The press 24 is a commercial device and serves to de-water the moist mixed material under pressure and to convert it into combustible briquettes. The fuel can be supplied via 25 to the public market or part of it can be converted directly to heat in a two-stage high temperature burner 26.

The heat can be delivered to a district heating system 27 and/or via 28 to an in-house supply system, for example to supply the pulp drier 12. The ash from 26 has to be dumped via 29 or further processed.

The material freed from ferrous metals is separated into two fractions in the sorter 4. The heavy fraction separated there consists of minerals and moist organic substances which cannot be air-floated and is passed to a water classifier 16. The water classifier serves to separate the minerals and non-ferrous minerals from the organic substances. The cleaned heavy substances can be separated in 17 into non-ferrous metals and minerals and passed on for further processing. The organic substances are led with the water from position 16 into a settling basin 18. Position 18 separates the organic substances from the water. The organic substances are introduced into the reactor 19 that has already been described. The water is returned to the classifier 16 and the washing plant 7 (circulation).

The air-floatable fraction is introduced into the washing plant 7 from the sorter 4. It, or at least part of it, can alternatively be led via a by-pass to the mixer 23 to influence the heat content and the moisture therein.

The washing plant 7 serves to wash out the organic contaminants adhering to the air-floatable material. The contaminants pass with the wash water to the settling basin 18 described above. The clean water is, as already mentioned, returned to 16 and 7.

The washed air-floatable material, mainly all kinds of papers, textiles and plastics materials, is introduced into the pulper 8. The pulpers 8 (which can also be called wet shredders or pulping mills) are commercial devices. Into these devices, which are filled with hot water generally at 30° to 50° C., the material is introduced with a very large excess of water (proportion about 5:95% water). The centrifugal effect of the rotating water comminutes the paper and breaks it down to fibres. To this extent the pieces of paper contained in the air-floatable fraction "dissolve" with this wet milling process into the individual cellulose fibres. The pulp-textile-plastics material mixture obtained in this way is pumped into the screening device 9. The screening device 9 is a submerged screening device and separates the pulp from the ballast materials. The effluent from the screening device is passed to a treatment plant 30. The purified water is then returned to the pulper 8. The organic slurries then pass into the reactor 19 already mentioned.

The ballast materials from the screening device 9 are then separated from most of the water in the filter press 11 and passed to the mixer 23 already mentioned.

The contaminated water is supplied to the settling basin 18 that has likewise been described. The pulp removed from the screening device 9 is supplied to a press 10. The press 10 de-waters the pulp until it no longer drips so that it can be transported to the paper mills 13 in ordinary trucks. The water expressed in the press 10 is likewise passed to the treatment plant 30 described above.

In parallel to this the pressed pulp from 10 can be introduced to a drying and pulverizing operation 12. The energy for this is obtained from the internal supply system 26, 28. The dry cellulose powder is supplied as a high grade carrier or additive via step 14 to the appropriate industries.

Advantageously the paper production 13, 14, 15 is directly connected with the processing according to the invention so that the effluent resulting therefrom can likewise be disposed of via the treatment plant 30 or the settling basin 18 and the contaminants treated together, and the off-cuts and production waste from the paper production can be returned and recycled.

The processing according to the invention provides many advantages, namely:

1. Cellulose is recovered from the mixed refuse without hand sorting.
2. The valuable materials present in the refuse are completely utilized.
3. Only a very small proportion of residues from the refuse remain (max. 3% ash) which need to be dumped.
4. The processing requires only minimal expenditure of energy.
5. High quality materials are obtained.
6. The system is independent of the composition of the refuse.
7. The process is not tied to markets for individual products.
8. It is possible for the first time to produce agricultural products with a low content of harmful substances.
9. In the paper production the problem of disposing of substances that cannot be worked up is obviated (usually 30% of the input consists of material that has to be dumped).
10. The process can be used anywhere that rubbish is produced.

What is claimed is:

1. In the method for producing cellulose material from domestic and industrial waste by removing decomposable and non-decomposable contaminants from said waste during the steps of precomminution, magnetic separation, and air classification and fractionation, resulting in a light fraction comprising paper, textiles and plastic material, and a heavy fraction comprising minerals and moist organic substances, the improvement which comprises the steps of:

a) washing the light fraction in a washing station to remove organic contaminants adhering to the light fraction, b) contacting the washed light fraction with water at a temperature of about 30° C. to 50° C. in a pulper while rotating the water in the pulper to further comminute and dissolve paper contained in the light fraction producing individual cellulose fibers, c) passing the contents of the pulper through a screen submerged in the water of the pulper to separate the light fraction into cellulose fibers and a ballast comprising textiles and plastic material, and d) removing the cellulose fibers from the pulper and pressing the water therefrom.

2. A method according to claim 1 wherein said cellulose fibers are further processed in a paper mill.

3. A method according to claim 1, wherein said cellulose fibers are separated, dried and recovered as powder.

4. A method according to claim 1, wherein the decomposable contaminants are collected and introduced into a bioreactor to produce methane gas.

5. A method according to claim 4, wherein any contaminants that are not decomposed in the bioreactor are separated by screening into two fractions, a fine fraction convertible to fertilizer products and a coarse fraction convertible to solid fuel after dewatering and addition of energy carriers.

* * * * *